United States Patent
Neufeglise (10) Patent No.: US 9,592,768 B2
(45) Date of Patent: Mar. 14, 2017

(54) METHOD AND APPARATUS FOR MOUNTING A LIGHT BAR ON THE ROOF OF A VEHICLE

(75) Inventor: Steven W. Neufeglise, Rochester, NY (US)

(73) Assignee: STAR HEADLIGHT & LANTERN CO., INC., Avon, NY (US)

( * ) Notice: Subject to any disclaimer, the term of this patent is extended or adjusted under 35 U.S.C. 154(b) by 558 days.

(21) Appl. No.: 12/381,368

(22) Filed: Mar. 11, 2009

(65) Prior Publication Data
US 2010/0230566 A1 Sep. 16, 2010

(51) Int. Cl.
*B60R 9/045* (2006.01)
*B60Q 1/26* (2006.01)
(Continued)

(52) U.S. Cl.
CPC .......... *B60R 9/045* (2013.01); *B60Q 1/2611* (2013.01); *B60R 9/058* (2013.01); *B60Q 1/46* (2013.01);
(Continued)

(58) Field of Classification Search
CPC ............................. B60R 9/045; B60R 9/058
(Continued)

(56) References Cited

U.S. PATENT DOCUMENTS 1,056,596 A * 3/1913 Sidoli ........................ 248/65
2,596,860 A * 5/1952 McCrory et al. ........... 224/325
(Continued)

FOREIGN PATENT DOCUMENTS

DE 2643037 A1 * 6/1977
DE 3138146 A1 * 4/1983 ............... B60R 9/04
(Continued)

OTHER PUBLICATIONS

Herweg et al., Luggage rack for a vehicle roof—makes use of a fastening claw to secure a releasable connection (Machine translation), Jul. 23, 1992.*

*Primary Examiner* — Leslie A Nicholson, III
*Assistant Examiner* — Chiedu Chibogu
(74) *Attorney, Agent, or Firm* — Kenneth J.Lukacher Law Group (57) ABSTRACT

A universal mounting for a light bar which is adjustable in a vertical direction as well as pivotable and tiltable along pitch and roll axes, respectively, longitudinal and lateral of the vehicle to enable leveling of the light bar on the roof while attaching the light bar to the vehicle. There are two mountings which are attached to the light bar under opposite ends thereof. Each mounting has a fixed bracket attached to the roof and an adjustable bracket clamped to the fixed bracket with a mounting bolt threadedly engaged in a pivot connection in the adjustable bracket to enable adjustment about the pivot axis. The pivot connection may also be movable vertically (up or down) with respect to the roof. Vertical and pivotal adjustability facilitates alignment of the bolt in a threaded fastener in the pivot connection. The adjustable bracket has upper and lower parts. The upper part is connected to the light bar and is tiltable with respect to the lower part about the roll axis. The adjustability provided about the pivot and roll axes as well as the vertical adjustability compensate for various roof curvatures and like brackets may be used in each mounting to attach the light bar to the roofs of various types of vehicles.

17 Claims, 9 Drawing Sheets

(51) Int. Cl.
*B60R 9/058* (2006.01)
*B60Q 1/46* (2006.01)

(52) U.S. Cl.
CPC .. *Y10S 224/9175* (2013.01); *Y10T 403/32573* (2015.01)

(58) Field of Classification Search
USPC ........ 248/222.14, 220.21, 205.1, 299.1, 544, 248/201, 214, 226.11, 230.5, 231.61; 362/542, 493, 253, 234, 396, 382
See application file for complete search history.

(56) References Cited

U.S. PATENT DOCUMENTS

| | | | | |
|---|---|---|---|---|
| 3,064,868 A * | 11/1962 | Treydte | ...... | 224/330 |
| 3,385,488 A * | 5/1968 | Bronson | ...... | 224/331 |
| 3,677,451 A * | 7/1972 | Burland | ...... | 224/322 |
| 3,837,547 A * | 9/1974 | Joos | ...... | 224/331 |
| 3,858,774 A * | 1/1975 | Friis | ...... | 224/325 |
| 4,104,614 A * | 8/1978 | Litman | ...... | 340/472 |
| 4,114,789 A * | 9/1978 | Blaylock et al. | ...... | 224/321 |
| 4,124,317 A * | 11/1978 | Dauth | ...... | 403/8 |
| D254,603 S | 4/1980 | Gosswiller | | |
| 4,345,705 A * | 8/1982 | Graber | ...... | 224/324 |
| 4,620,268 A * | 10/1986 | Ferenc | ...... | 362/517 |
| 4,688,706 A * | 8/1987 | Thulin | ...... | 224/329 |
| 4,778,092 A * | 10/1988 | Grace | ...... | 224/331 |
| 4,861,182 A * | 8/1989 | Gillet | ...... | 403/264 |
| 4,995,538 A * | 2/1991 | Marengo | ...... | 224/329 |
| 5,224,309 A * | 7/1993 | Bodell | ...... | 52/127.1 |
| 5,366,128 A * | 11/1994 | Grim | ...... | 224/330 |
| D355,142 S | 2/1995 | Wagner | | |
| 5,729,016 A * | 3/1998 | Klapper et al. | ...... | 250/334 |
| 5,785,474 A * | 7/1998 | Kinouchi et al. | ...... | 410/96 |
| 5,829,654 A * | 11/1998 | Weger et al. | ...... | 224/322 |
| 5,845,828 A * | 12/1998 | Settelmayer | ...... | 224/321 |
| 5,848,743 A * | 12/1998 | Derecktor | ...... | 224/331 |
| 5,884,997 A | 3/1999 | Stanuch et al. | | |
| RE36,245 E * | 7/1999 | Stanuch et al. | ...... | 362/480 |
| 5,931,359 A * | 8/1999 | Zona | ...... | 224/321 |
| 5,984,155 A * | 11/1999 | Stapleton | ...... | 224/321 |
| 6,382,483 B1 * | 5/2002 | Kleb et al. | ...... | 224/321 |
| 6,631,957 B2 * | 10/2003 | Leong | ...... | 297/440.13 |
| 6,722,776 B1 * | 4/2004 | Lyons et al. | ...... | 362/493 |
| D491,482 S * | 6/2004 | Chiang | ...... | D10/114.4 |
| 6,843,394 B2 * | 1/2005 | Aki | ...... | 224/309 |
| 6,845,893 B2 * | 1/2005 | Nelson | ...... | 224/322 |
| 7,244,053 B2 * | 7/2007 | Bader et al. | ...... | 362/493 |
| 7,517,120 B2 * | 4/2009 | Smith | ...... | 362/493 |
| 8,292,478 B2 * | 10/2012 | Bader et al. | ...... | 362/493 |
| 2007/0258257 A1 | 11/2007 | Stein | | |
| 2008/0019141 A1 | 1/2008 | Helms et al. | | |
| 2008/0137356 A1 * | 6/2008 | Smith | ...... | 362/493 |
| 2008/0304276 A1 | 12/2008 | Helms et al. | | |

FOREIGN PATENT DOCUMENTS

DE  19740820 A1 * 4/1998
FR  951852 A * 11/1949

* cited by examiner

METHOD AND APPARATUS FOR MOUNTING A LIGHT BAR ON THE ROOF OF A VEHICLE

The present invention relates to light bar mounting and particularly to a universal light bar mount which enables the light bar to be installed in a level position notwithstanding the vehicle having roofs of different curvatures. By level position is meant various angular orientations of the light bar including and other than horizontal, which may be used to improve aerodynamic characteristics of the light bar installation and limit wind noise.

Mountings or mounting kits for installation of light bars on vehicles have heretofore been proposed. Some of these mountings and mounting kits are illustrated in the following representative U.S. patents and Published Patent Applications: Gosswiller, U.S. Pat. No. Des. 254,603, issued Apr. 1, 1980; Wagner, U.S. Pat. No. Des. 355,142, issued Feb. 7, 1995; Stanuch et al., U.S. Pat. No. 5,884,997, issued Mar. 23, 1999; Nelson, U.S. Pat. No. 6,845,893, issued Jan. 25, 2005; Bader et al., U.S. Pat. No. 7,244,053, issued Jul. 17, 2007; Stein, U.S. Patent Pub. No. US2007/0258257, Published Nov. 8, 2007, Helms et al., U.S. Patent Pub. No. US2008/0019141, Published Jan. 24, 2008; Helms et al., U.S. Patent Pub. No. US2008/0304276, Published Dec. 11, 2008. These mountings are not universal in that different mounting parts are required in order to adapt the mounting to vehicles having roofs of different curvatures. Moreover, the curvature of the roof can make the installation of the mounting difficult and labor intensive in order to bend or fit the mounting parts into alignment with each other to enable a satisfactory installation. If the installation is not done properly and gaps are left between the light bar and the roof, the aerodynamic characteristics of the vehicle may be altered adversely, leading to undesirable wind noise as the vehicle is driven at highway speeds.

It is the principal object of the present invention to provide a universal method and apparatus for mounting a light bar on the roof of a vehicle which facilitates the installation thereof and enables like parts to be used even when the vehicles have roofs of significantly different curvature extending longitudinally between the front and back of the vehicle or laterally from one side of the vehicle to the other.

It is a feature of the invention to provide an improved light bar mounting assembly which is universally adjustable for rotation about plural axes or vertically in an upward or downward direction with respect to the roof of the vehicle.

Briefly described, a mounting provided by the invention, has mountings which are attached to the light bar on the underside thereof near the ends thereof. These mountings are adjustable and have floating connections to fixed connections attached to the vehicle, for example, by brackets or straps connected in the gutters or rain gasket grooves along the sides of the vehicles where the roof meets the body of the vehicles. Floating connections may be provided by a pivot which is threadedly engaged with a clamping bolt extending from the fixed connection. The pivot provides for adjustment by pivoting rotation about an axis extending longitudinally of the vehicle. The pivot may also be movable vertically. The rotational and vertical movement facilitates alignment of the bolt with the threaded connection in the pivot. The rotation also accommodates for different positions of the fixed bracket due to the curvature of the roof, which curvature the fixed bracket follows. Accordingly, like fixed brackets may be used in the mounting notwithstanding the curvature of the roof so that the mounting is universal in application. In addition, the adjustable connection may have two parts, namely a top part which is connected to the light bar and a bottom part which carries the pivot. The two parts may be connected by fasteners extending through slots which enable the top and bottom parts to tilt with respect to each other thereby facilitating adjustment along a roll axis extending laterally between the sides of the vehicle.

The foregoing and other objects, features and advantages of the invention will become more apparent from a reading of the following description in connection with the accompanying drawings in which:

FIGS. 12 and 13 are side elevations of the mounting assembly, in which FIG. 12 shows vertical adjustability of the adjustable mounting bracket within the limits of the pivot retainer slot of the bottom part of the adjustable mounting bracket.

Referring more particularly to the drawings, there is shown a light bar 1 mounted on a vehicle having a curved roof 3 with universal adjustable mountings 2 provided by the invention. These mountings have an adjustable mounting bracket made up of a mounting bracket top 4 and the mounting bracket bottom 5.

The mounting also includes fixed mountings provided by a gutter mount bracket 6 which is attached to the vehicle by gutter bracket attachment screws 17 extending into the wall of the door gasket groove.

The fixed bracket 6 is connected to the adjustable bracket and particularly, to the bottom 5 thereof with a gutter bracket bolt 7 extending into a threaded connection 10 in a pivot 12, this bolt is part of a floating connection for the adjustable bracket. The bolt 7 is turned to clamp the adjustable bracket consisting of the mounting bracket top 4 and the mounting bracket bottom 5 to the fixed, gutter mount bracket 6. The pivot 12 can rotate about a longitudinal pivot axis and move vertically simultaneously by virtue of the floating connection. See FIGS. 12 and 13. Also, prior to insertion of the gutter bracket bolt 7 into the threaded connection 10, the pivot 12 may be pivoted and moved vertically in order to align the bolt 7 with the threaded connection 10 in the pivot assembly.

Figure 9:
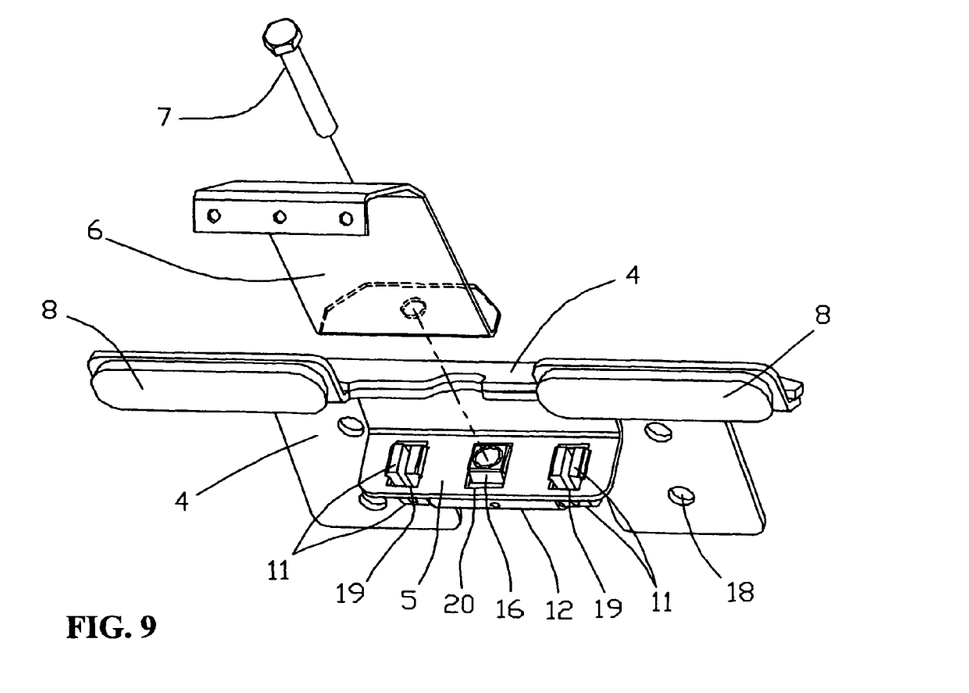
FIG. 9 is a perspective, partially exploded view from the front, showing the underside of the mounting bracket with the pivot components assembled.
Figure 11:
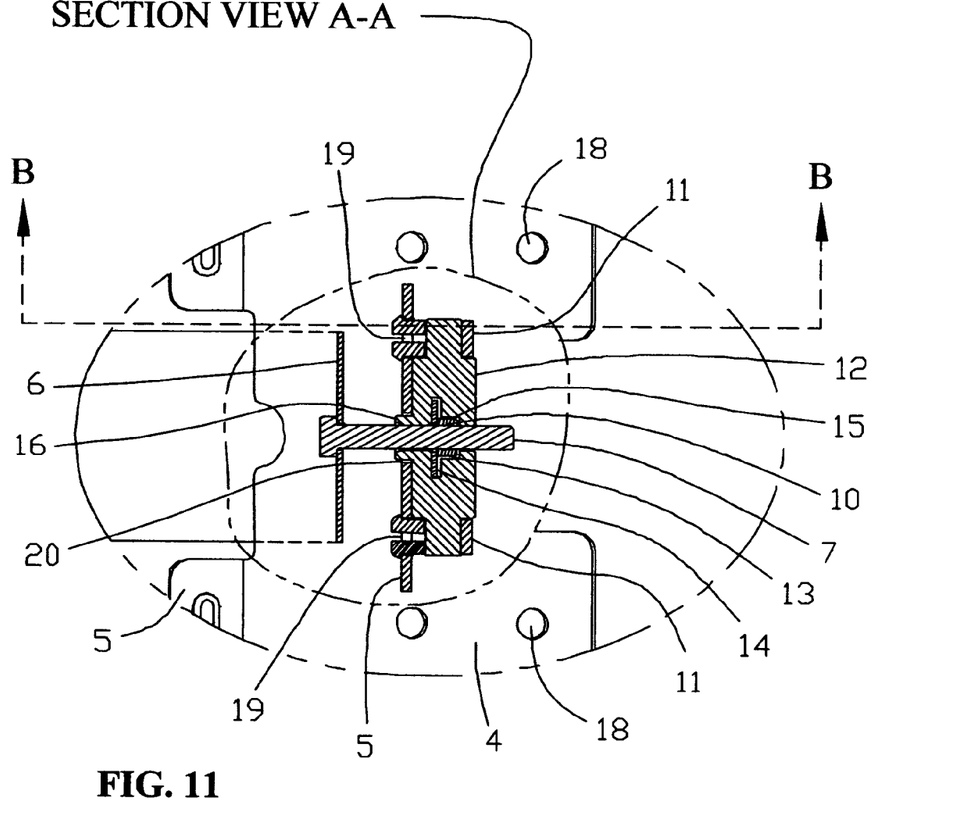
FIG. 11 is a top elevational view taken along the line A-A in FIG. 4 and showing the pivot assembly in the bottom part of the adjustable mounting bracket and the threaded connection therein for a bolt which extends from the fixed or gutter mounting bracket.

The threaded connection 10, which provides a lock nut assembly, is afforded by a threaded fastener provided by a hex nut 13 in a nut pocket 15. A nut plate 14 is captured in a groove in the pocket 15 and provides a washer for the nut 13. The pivot 12 has a stub or tab 16 which extends through a pivot tab hole 20 in the bottom part 5 of the adjustable mounting bracket, as best shown in FIGS. 9 and 11. The hole 20 has sufficient clearance so as to enable the pivot to turn about the pivot axis which extends through pivot retainer journals 11. These journals 11 act as bushings in which cylinder's extending from the pivot 12 rotate.

Figure 13:
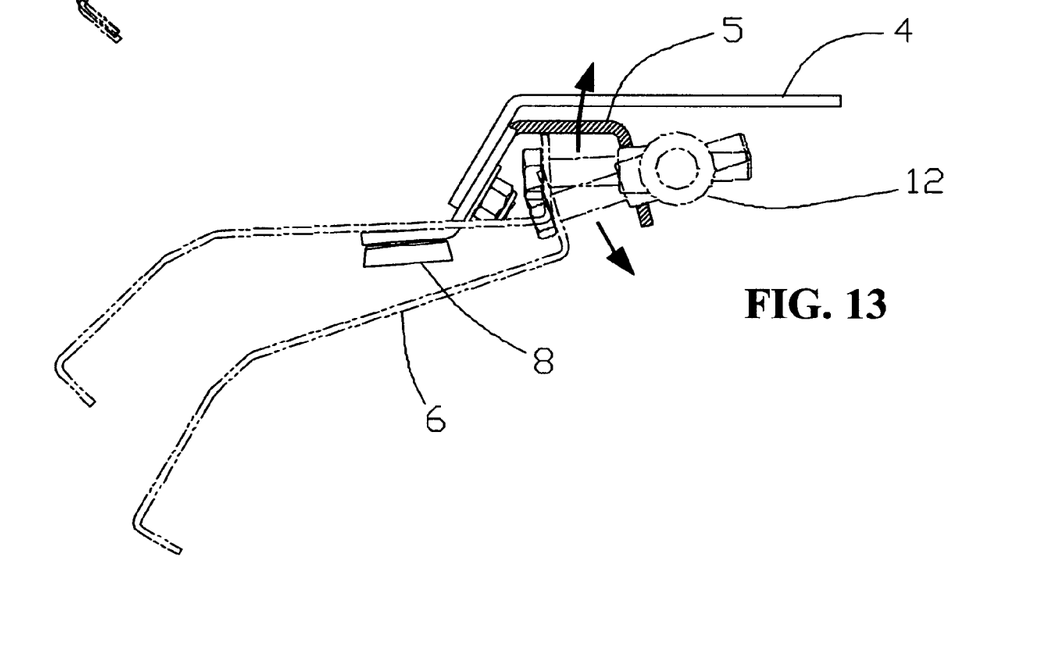
FIG. 13 shows the pivoting or rotational adjustability within the pivot retainer slot of the adjustable mounting bracket, these views illustrating how the adjustable mounting bracket accommodates for different positions, of the fixed or gutter mounting bracket which may be caused by roofs of different curvature on which the fixed mounting bracket may be disposed.

As the pivot 12 rotates, the pivot 12 in the adjustable mounting bracket (parts 4 and 5), rotates about the pivot axis with respect to the fixed, gutter mount bracket 6, as shown in FIG. 13 and is also movable vertically in the hole 20.

Figures 1, 2, 3, 4:
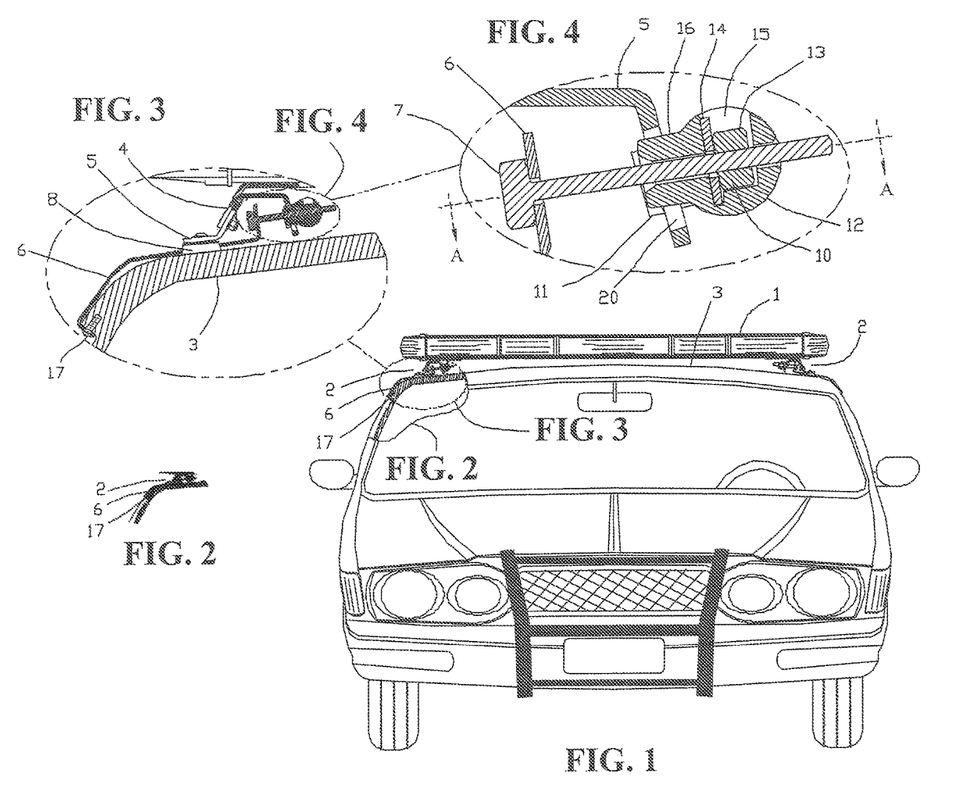
FIG. 1 is a front elevation of a vehicle with a light bar attached to the roof of the vehicle with mountings provided in accordance with the invention.
FIG. 2 is a broken away portion of FIG. 1 where the mounting for the light bar at one end thereof is located.
FIG. 3 is an enlarged portion of FIG. 2 within the line of long and short dashes designated as FIG. 3 which is enlarged to show the parts of the mounting and parts of the roof and the light bar.
FIG. 4 is an enlargement of FIG. 3 within the lines of long and short dashes designated as FIG. 4 in FIG. 3.
Figure 5:
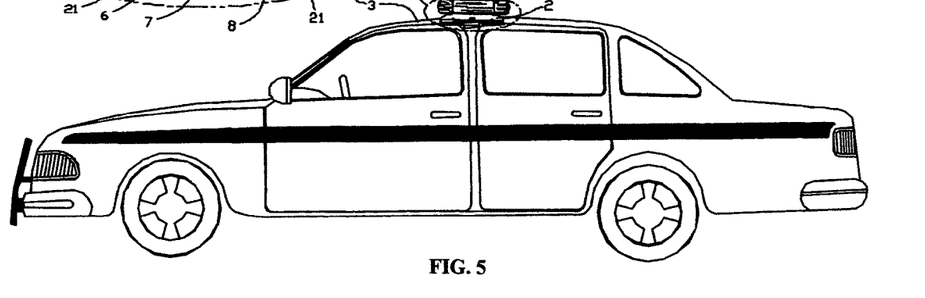
FIG. 5 is a side elevation of the vehicle with the light bar mounted thereon using a mounting provided by the invention.
Figure 6:
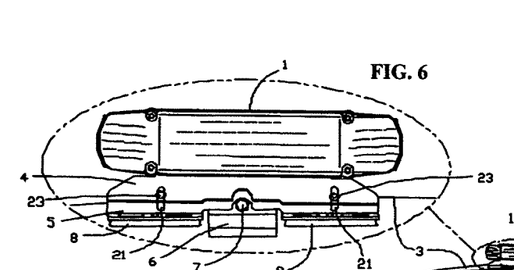
FIG. 6 is an enlarged portion of the light bar and mounting shown in FIG. 5 within the lines indicated by long and short dashes and labeled FIG. 6 in FIG. 5.
Figure 7:
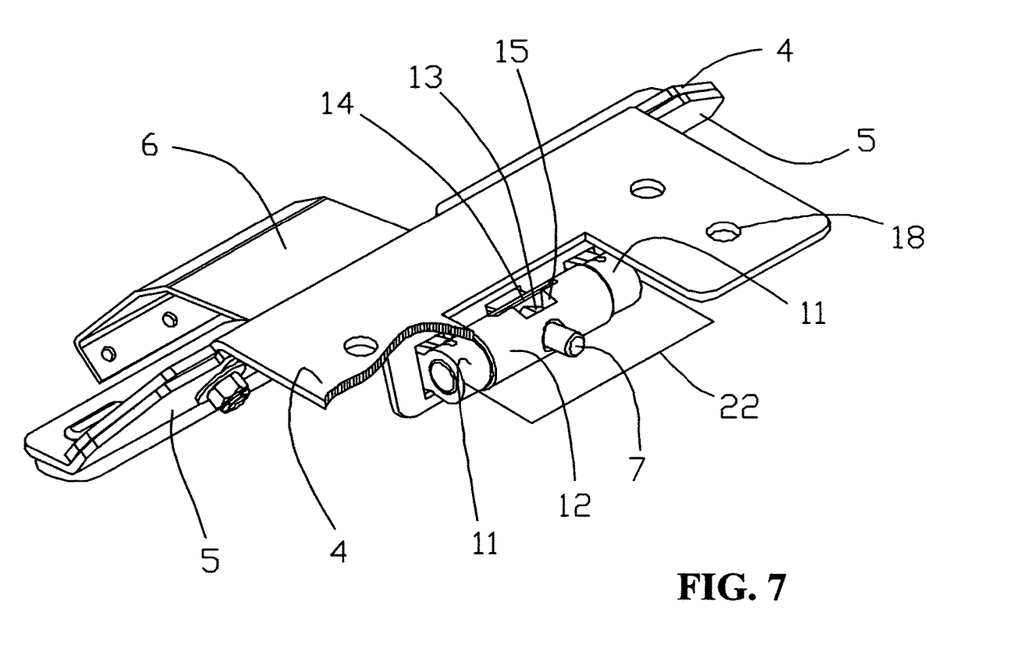
FIG. 7 is a perspective view of the assembled mounting, which is partially cut away to illustrate the pivot assembly of the mounting.
Figure 8:
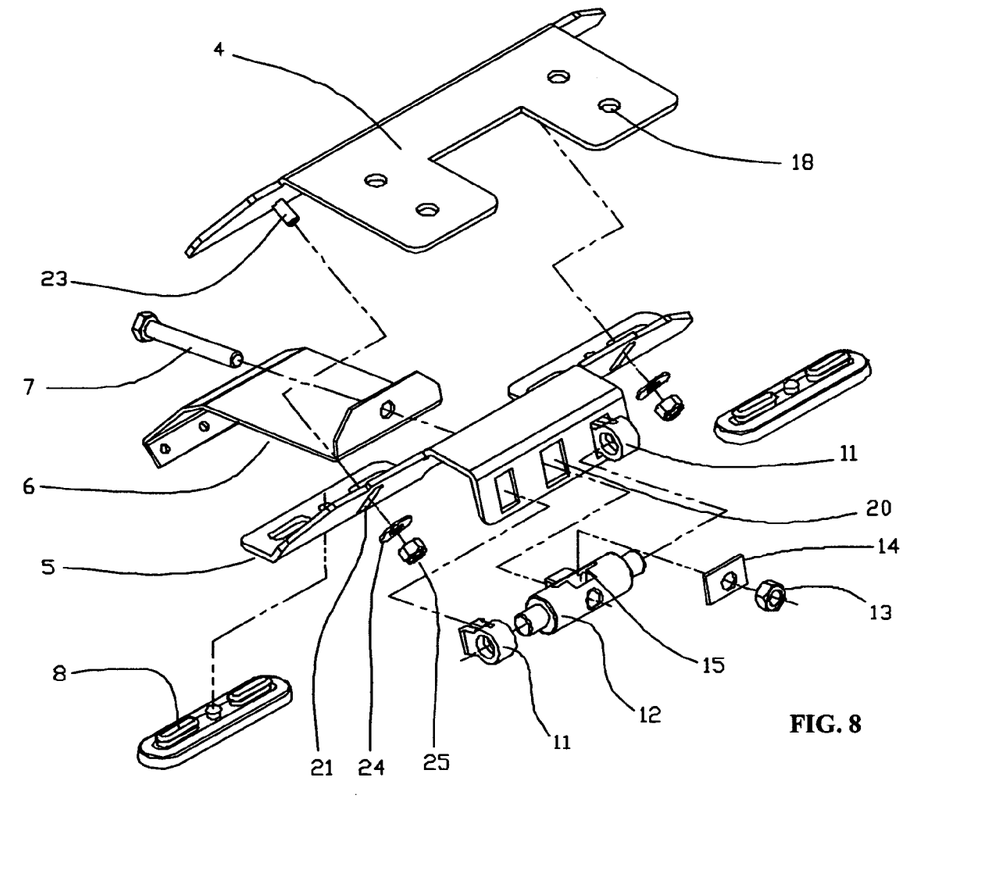
FIG. 8 is an exploded perspective view of the mounting shown in FIG. 7.
Figure 10:
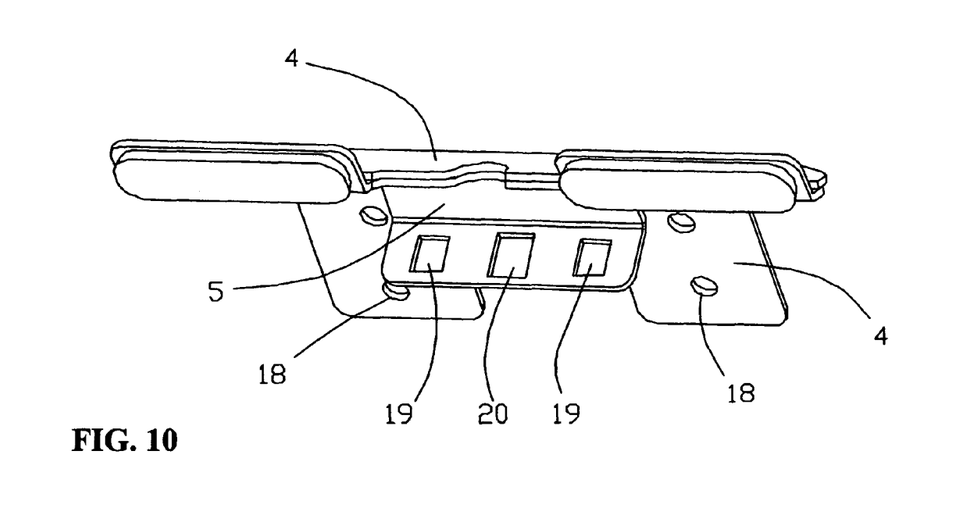
FIG. 10 is a perspective view of the underside of the mounting bracket, and particularly the adjustable part thereof with the pivot assembly removed.
Figure 12:
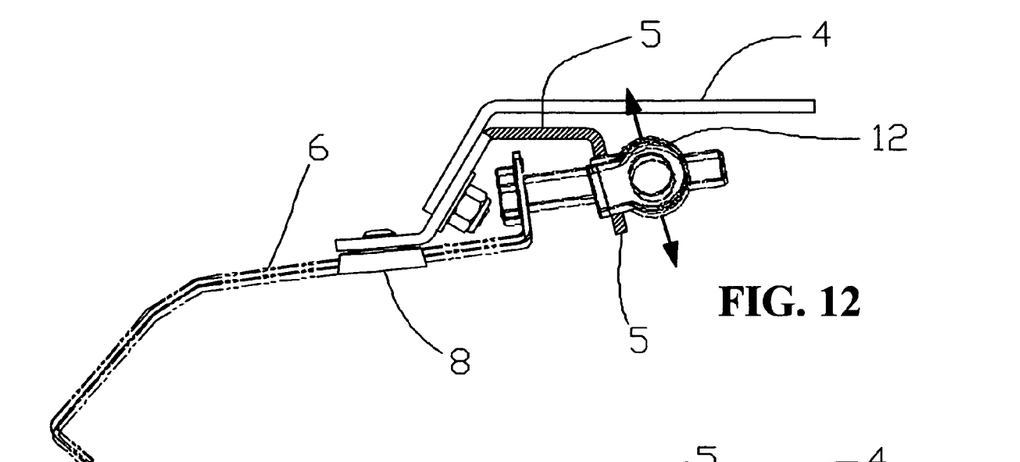

The holes 19 (FIGS. 9-11) in which the pivot retainers 11 are attached have clearance to enable vertical motion of the pivot 12 and its retainers 11 with the adjustable bracket parts 4 and 5, as shown in FIG. 12. The retainers 11 have spring-apart clips or fingers which provide a snap-in connection for the retainers in bottom part 5 of the adjustable mounting bracket. Such bottom part 5 has feet 8 in which rubber or other soft material pads are held and engage the roof when the mount is in place, as shown in FIG. 3. The pivot 12 and the retainers 11 may be made of plastic, preferably polycarbonate or glass fiber impregnated nylon plastic. The light bar 1 is mounted in holes 18 (FIGS. 7-10) in the top part of the adjustable mounting bracket. Access, as via a hole, may be provided for a cable providing electrical connections to the light bar is not shown to simplify the illustration.

Tilting adjustment of the adjustable mounting bracket is provided by tilting the top part 4 of the adjustable bracket with respect to the bottom part 5 of the adjustable bracket using slots 21 in the bottom part 5 of the adjustable bracket through which screw studs 23 extend. The top part 4 is tilted with respect to the bottom part about a roll axis extending between the sides of the vehicle and fastened at the desired tilt position with mounting bracket lock nuts 25 and mounting bracket washers 24. As the top part 4 tilts about the roll axis with respect to the bottom part 5 using slots 21 and screw studs 23, such tilt of the top part 4 about the roll axis is independent of feet 8 of bottom part 5 which engage the roof.

Accordingly, there is provided a universal mounting for the light bar with pivot adjustment about a pivot axis and tilt adjustment about a roll axis perpendicular to the pivot axis. Adjustability in vertical position of the adjustable mounting bracket is also provided. The pivot axis represents a longitudinal axis extending in the direction between the front and back (e.g., longitudinally along the length) of the vehicle, and the roll (or tilt) axis representing a lateral axis extending between the sides (e.g., laterally along the width) of the vehicle.

The mounting of a light bar 1 provided by a pair of brackets, each representing an assembly of bracket top 4 and bottom 5 and above described components to provide a mechanism for leveling the light bar about pivot and roll axes when such brackets attached near different ends of the light bar are mounted to the roof of a vehicle. Such bracket adjustability about the pivot and roll axes improves light bar installation by enabling the light bar to be positioned substantially level upon roofs of different types or models of vehicles which may have different roof curvatures. Also, the fastening of each adjustable bracket (e.g., attached to light bar 1) to a vehicle roof (e.g., by a fixed bracket 6 via bolt 7) and adjustment thereof for leveling light bar 1 may be carried out simultaneously if desired.

Figure 14:
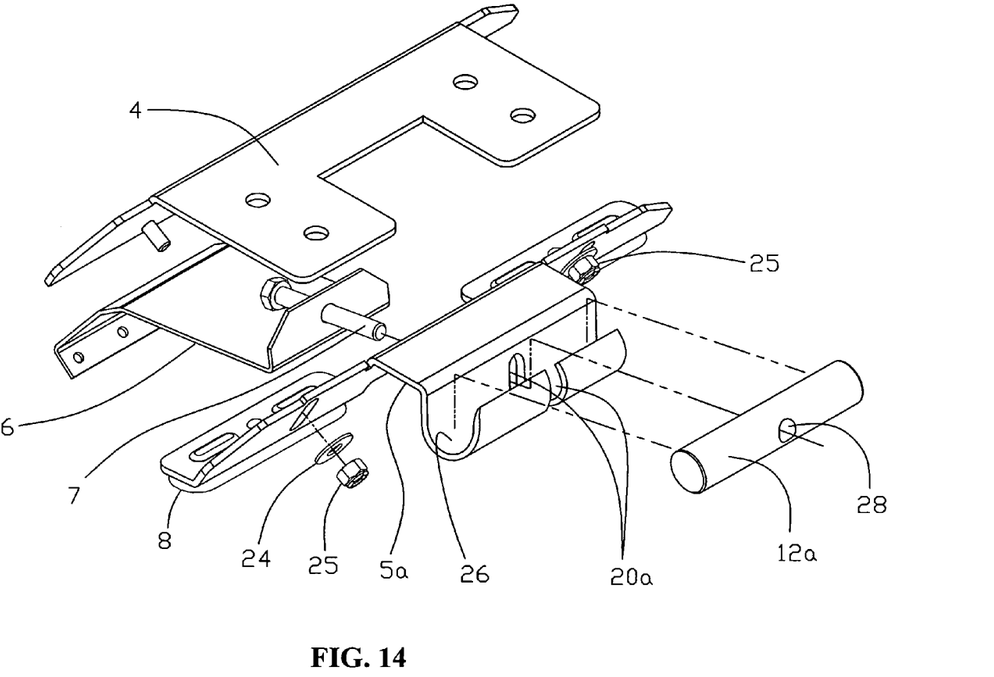
FIG. 14 is an exploded view similar to FIG. 8 showing another embodiment of the invention wherein the adjustable pivot is mounted in a pivot cradle of the mounting bracket.
Figure 15:
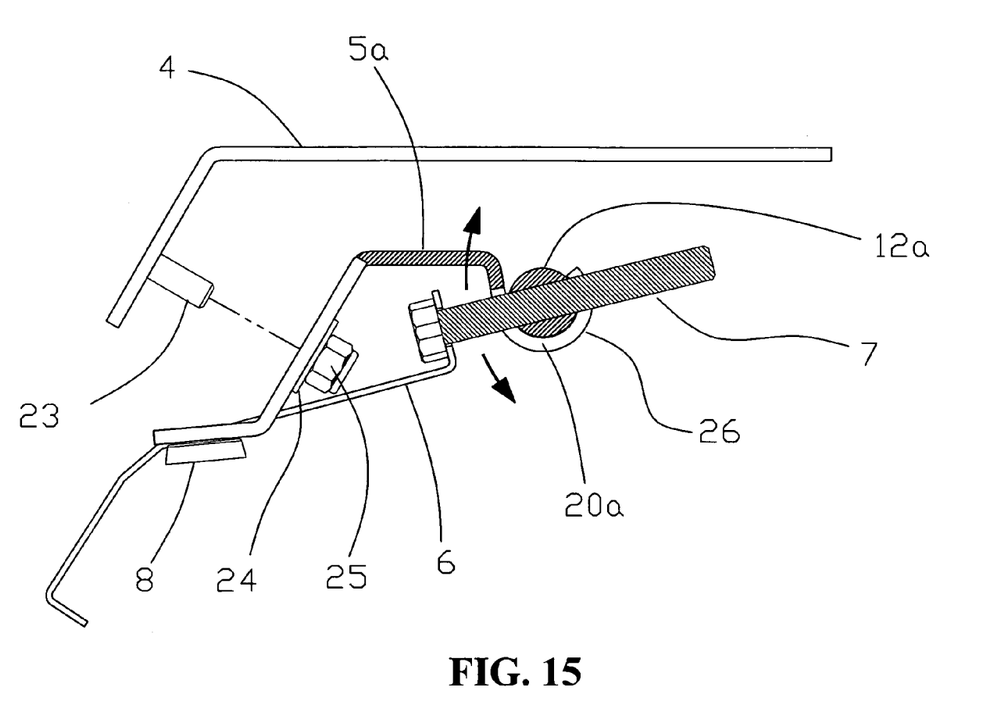
FIG. 15 is a side elevation, partially in section showing the cradle mounting which journals and assembles the pivot in the mounting bracket.

Referring to FIGS. 14 and 15, where like parts are identified with like referenced numerals to those used in the previous figures. The cost of the pivot assembly may be reduced by forming the bottom part 5a of the mounting bracket with a semi-tubular channel providing a cradle for a cylinder (or rod) 12a which provides the pivot. The pivot cylinder 12a has a threaded hole 28. The bolt extends through a slot 20a which is vertically elongated and curves around the side of the cradle 26. The bolt 7 extends through the slot 20a into the threaded hole 28 for fastening the adjustable mounting bracket parts 4 and 5 to the gutter mounting bracket 6. The pivot cylinder 12a may be inserted from an end of the cradle 26. The cradle's curve section extends over an arch of more than 180° so that it captures the cylinder 12a providing the pivot. The pivot cylinder 12a is rotatable, since the slot 20a is longer than the diameter of the bolt 7, and the bolt 7 is movable vertically in response to cylinder rotation. The mounting brackets therefore have a floating connection via the pivot cylinder 12a to the gutter mount bracket 6 providing for rotational and vertical adjustability in the bracket assembly.

Variations and modifications within the scope of the invention will undoubtedly suggest themselves to those skilled in the art. Accordingly, the foregoing description should be taken as illustrative and not in a limiting sense.

The invention claimed is:

1. A method of mounting a light bar on a curved roof of a vehicle which comprises the steps of:
    fastening an upper portion of a mounting bracket to said light bar;
    locating a bottom portion of said mounting bracket upon said roof of the vehicle in which said upper portion is tiltable with respect to said bottom portion about a first axis extending laterally along a width of the vehicle;
    fastening a pivot to a fixed connection to one end of the roof of the vehicle by clamping said mounting bracket with the aid of a strap attached at one end to said one end of said roof and a clamping bolt extending through said strap into a nut in said pivot;
    coupling said mounting bracket to said pivot for rotational movement about a second axis extending longitudinally along a length of the vehicle; and
    adjusting said mounting bracket about said first and second axes to compensate for the curvature of said roof in order to substantially level said light bar.

2. The method according to claim 1 further comprising moving said mounting bracket with said pivot in a direction which is vertical to said roof to adjust the height of said light bar above said roof.

3. The method according to claim 1 wherein said mounting bracket represents a first one of said mounting bracket, and said method further comprises the step of repeating said fastening said upper portion, locating said bottom portion, fastening said pivot, coupling, and adjusting steps for a second one of said mounting bracket, in which said first and second ones of said mounting bracket are fastened near opposite ends of said light bar.

4. The method according to claim 1 wherein said locating step further comprises locating the bottom portion of said mounting bracket upon said roof of the vehicle with the aid of feet, in which said upper portion is tiltable with respect to said bottom portion about said first axis independent of said feet.

5. The method according to claim 1 further comprising the step of fixing said upper portion at a tilt position with respect to said bottom portion after said adjusting step is carried out.

6. A mounting for a light bar on a roof of a vehicle comprising:
mounting brackets fastenable to said vehicle at opposite sides of said roof to provide fixed mounting brackets with respect to said roof;
adjustable mounting brackets fastenable under said light bar at opposite ends thereof;
a pivot coupling each of said adjustable mounting brackets in floating relationship to a different one of said fixed mounting brackets to enable pivoting of said adjustable mounting bracket about a first axis extending longitudinally along a length of the vehicle to position said light bar substantially level with respect to said roof about said first axis when said fixed mounting brackets are fastened to said roof and said adjustable mounting brackets are fastened to said light bar;
each of said adjustable mounting brackets having an upper portion fastenable under said light bar and a lower portion mountable upon the roof of the vehicle, and said upper portion is coupled to said lower portion to tilt the light bar about a second axis extending laterally along a width of the vehicle to position said light bar substantially level with respect to said roof about said second axis;
wherein said floating relationship of each of said adjustable mounting brackets with said different one of said fixed mounting brackets provides vertical adjustment of said adjustable mounting bracket up and down with respect to said fixed mounting bracket and rotation of said adjustable mounting bracket about said first axis with respect to said fixed mounting bracket, and said rotation is provided by a pivotal section journalled in said lower portion of said adjustable mounting bracket, said pivotal section being connected to said fixed mounting bracket via a bolt through an opening of said lower portion of said adjustable mounting bracket providing clearance for said bolt for rotation with said pivotal section and vertical displacement of said bolt with said pivotal section, and said mounting further comprising retainers encaptured in openings in said adjustable mounting bracket having clearance providing for vertical displacement of said retainers with said pivotal section journalled therein.

7. The mounting according to claim 6 wherein said vertical adjustment and said rotation about said first axis is enabled simultaneously.

8. A mounting for a light bar on a roof of a vehicle comprising:
mounting brackets fastenable to said vehicle at opposite sides of said roof to provide fixed mounting brackets with respect to said roof;
adjustable mounting brackets fastenable under said light bar at opposite ends thereof;
a pivot coupling each of said adjustable mounting brackets in floating relationship to a different one of said fixed mounting brackets to enable pivoting of said adjustable mounting bracket about a first axis extending longitudinally along a length of the vehicle to position said light bar substantially level with respect to said roof about said first axis when said fixed mounting brackets are fastened to said roof and said adjustable mounting brackets are fastened to said light bar;
each of said adjustable mounting brackets having an upper portion fastenable under said light bar and a lower portion mountable upon the roof of the vehicle, and said upper portion is coupled to said lower portion to tilt the light bar about a second axis extending laterally along a width of the vehicle to position said light bar substantially level with respect to said roof about said second axis;
wherein said floating relationship of each of said adjustable mounting brackets with said different one of said fixed mounting brackets provides vertical adjustment of said adjustable mounting bracket up and down with respect to said fixed mounting bracket and rotation of said adjustable mounting bracket about said first axis with respect to said fixed mounting bracket;
wherein said vertical adjustment and said rotation about said first axis is enabled simultaneously; and
wherein said pivot coupling each of said adjustable mounting brackets in floating relationship to a different one of said fixed mounting brackets is journalled in said adjustable mounting bracket by retainer members in which said pivot is mounted in said retainer members via one or more openings in said adjustable mounting bracket which have clearance to enable said vertical adjustment.

9. The mounting according to claim 8 wherein said rotation is provided by a pivotal section journalled in said lower portion of said adjustable mounting bracket, said pivotal section being connected to said fixed mounting bracket via a bolt through an opening of said lower portion of said adjustable mounting bracket providing clearance for said bolt for rotation with said pivotal section and vertical displacement of said bolt with said pivotal section.

10. The mounting according to claim 9 wherein said fixed mounting brackets are gutter mount brackets attachable along the side edges of said roof of said vehicle.

11. The mounting according to claim 10 wherein said gutter mount brackets each have said bolt extending there through, a threaded fastener in said pivotal section engaging said bolt and clamping said adjustable mounting brackets and said gutter mount brackets together to assemble said mounting.

12. The mounting according to claim 8 wherein said lower portion comprises feet which engage the roof, and said upper portion operates to tilt about said second axis independent of said feet for positioning said light bar substantially level with respect to said roof about said second axis.

13. An apparatus for mounting for a light bar on a roof of a vehicle comprising:
a mounting assembly at each end of a light bar having a first member fastenable to the light bar, a second member fastenable to one end of the side of the roof, and a third member mountable upon the roof of the vehicle;

said second member being pivotally mounted to said first member for rotation about a first axis extending longitudinally along a length of the vehicle;

said third member being mounted to said first member for tilting said first member about a second axis extending laterally along a width of the vehicle to a fixed tilt position, in which rotation about said first axis and tilt about said second axis levels the light bar on the roof notwithstanding the curvature of the roof, wherein said second member is mounted for vertical adjustment with respect to said third member to set the height of the light bar above the roof; and at each said end of the light bar a pivot coupling said third member in floating relationship with said second member which is coupled to said third member by retainer members, and said pivot is mounted in said retainer members via one or more openings in said third member which have clearance to enable said vertical adjustment.

14. The apparatus according to claim 13 wherein said first and third members are parts of a common bracket.

15. The apparatus according to claim 13 wherein said second member is a bracket having means for mounting said bracket to said one end of the side of the roof.

16. The apparatus according to claim 13 wherein said first member is retained at a fixed tilt position after said first member is tilted about said second axis.

17. The apparatus according to claim 13 wherein said first member operates to tilt about said second axis with respect to said third member independent of said third member engagement to and upon the roof.

* * * * *